United States Patent
Kibens et al.

(10) Patent No.: US 6,375,118 B1
(45) Date of Patent: Apr. 23, 2002

(54) HIGH FREQUENCY EXCITATION APPARATUS AND METHOD FOR REDUCING JET AND CAVITY NOISE

(75) Inventors: Valdis Kibens, St. Charles, MO (US); Ganesh Raman, Chicago, IL (US)

(73) Assignee: The Boeing Company, Chicago, IL (US)

( * ) Notice: Subject to any disclaimer, the term of this patent is extended or adjusted under 35 U.S.C. 154(b) by 35 days.

(21) Appl. No.: 09/651,515

(22) Filed: Aug. 30, 2000

(51) Int. Cl.[7] .............................................. B64D 33/04
(52) U.S. Cl. ...................... 244/53 R; 244/204; 244/207; 244/130; 244/1 N; 415/119
(58) Field of Search ................................ 246/204, 1 N, 246/53 R, 199, 207, 130; 415/119; 181/207, 208, 213, 222; 239/265.11; 381/71.7, 71.1, 71, 71.2, 7.5, 71.8, 71.14

(56) References Cited

U.S. PATENT DOCUMENTS

| | | | |
|---|---|---|---|
| 2,841,344 A | * 7/1958 | Stroukoff | 244/207 |
| 3,774,867 A | * 11/1973 | Quinn | 244/204 |
| 4,207,452 A | * 6/1980 | Shen | |
| 4,280,587 A | 7/1981 | Bhat | |
| 5,092,425 A | 3/1992 | Shaw, Jr. | |
| 5,353,598 A | * 10/1994 | Huck et al. | 181/213 |
| 5,818,947 A | * 10/1998 | Cattafesta, III et al. | 381/71.7 |
| 5,988,522 A | * 11/1999 | Glezer et al. | |
| 6,234,751 B1 | * 5/2001 | Hassan et al. | 415/119 |

OTHER PUBLICATIONS

Publication entitled "Acoustic Sources in a Tripped Flow past a Resonator Tube"; AIAA Journal, vol. 30, No. 6, Jun. 1992.

* cited by examiner

Primary Examiner—Galen L. Barefoot
(74) Attorney, Agent, or Firm—Harness Dickey & Pierce P.L.C.

(57) ABSTRACT

An active noise suppression apparatus and method for reducing jet engine noise and buffeting. A plurality of resonant cavities are formed in a structural member disposed on or adjacent to a jet engine exhaust nozzle. Each resonant cavity opens toward an output slot. A compressed air chamber is used to supply a pressurized, supersonic jetstream airflow through the inlet port into the interior area of the resonant cavity. This causes a high frequency, pulsed, excitation airstream to be generated outwardly from the cavity, out of the output slot and into the developing shear layer of the exhaust airflow. This high frequency, pulsed, excitation airstream induces modifications in the shear layer, which leads to a major reduction in the noise and buffeting generated by the developing shear layer. In an alternative embodiment, the resonant cavities are formed within one wall of a slot, where the slot is disposed along the leading edge of a cavity of the aircraft. The excitation airstreams cause a modification in the shear layer of the airflow over the cavity to significantly reduce the noise level and buffeting by the developing shear layer.

15 Claims, 3 Drawing Sheets

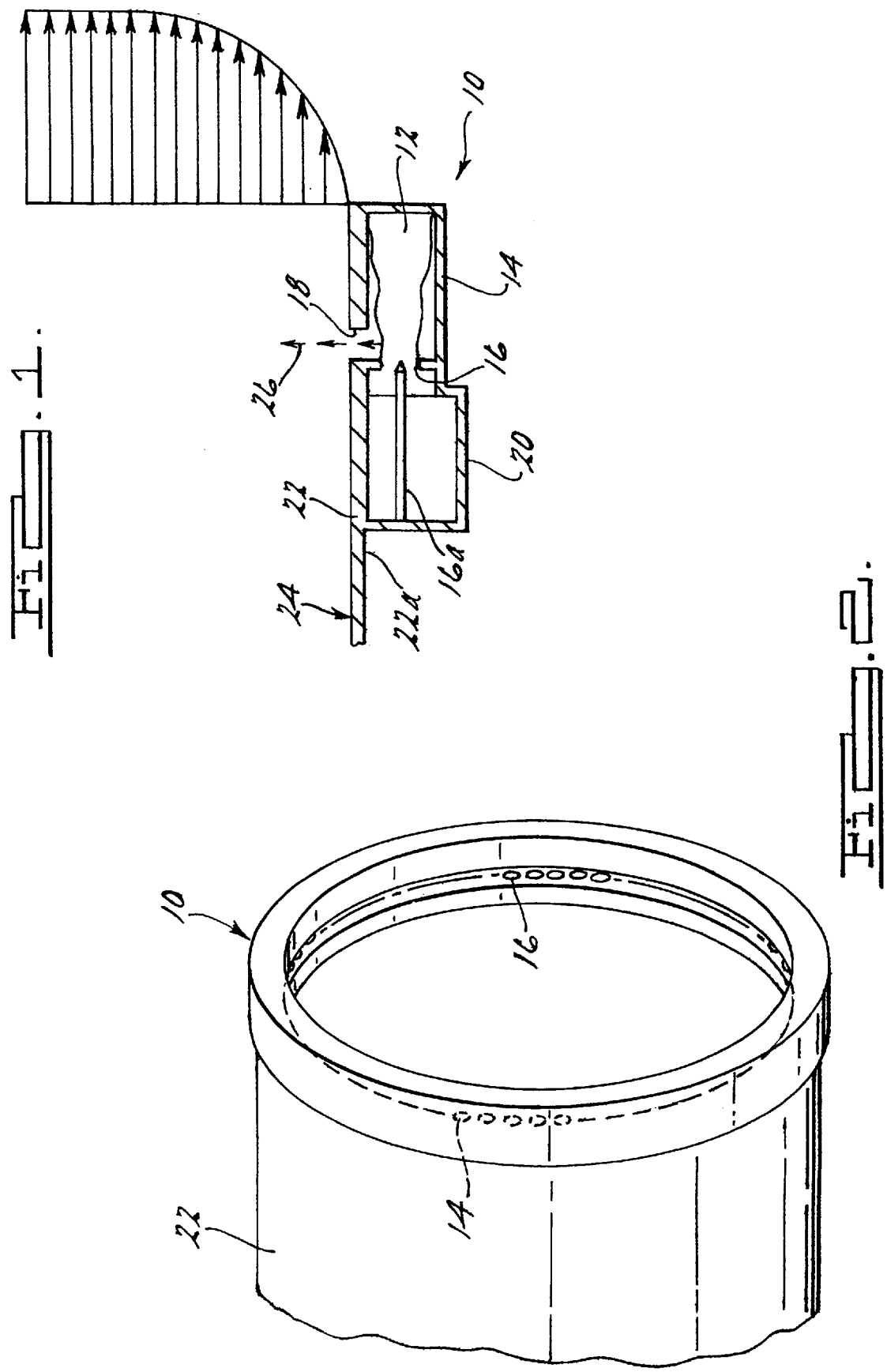

HIGH FREQUENCY EXCITATION APPARATUS AND METHOD FOR REDUCING JET AND CAVITY NOISE

TECHNICAL FIELD

This invention relates to apparatuses and methods for reducing jet engine noise, and more particularly to a high frequency resonance tube excitation system for injecting a plurality of high frequency, pulsed air streams within or adjacent to an exhaust nozzle of a jet engine, or a cavity of an aircraft, to modify the shear layer exhaust airflow exiting from the exhaust nozzle or moving over the cavity during operation of the jet engine.

BACKGROUND OF THE INVENTION

Reducing the noise emitted from jet aircraft engines, and more particularly jet aircraft engines associated with military aircraft, has gained increasing importance in recent years. The high levels of jet engine noise can contribute to wear and tear on the various panels used with an aircraft. In certain extreme instances, sonic fatigue caused by excessive jet engine noise may result in repairs being required to various panels of an aircraft. With military aircraft, the sonic fatigue generated by present day jet engines can cause sonic fatigue of various components associated with a weapons bay of the aircraft, as well as to wheel wells and other aircraft cavities. The exhaust airflow from today's jet engines can also cause ground erosion and present other environmental concerns as a result of extremely high noise levels.

With military aircraft, the high noise levels associated with the operation of present day jet aircraft engines is a factor that must be considered in the safe release and accurate delivery of weapons carried by the aircraft. The imposition of low observable requirements have recently emphasized the carriage of weapons in internal weapons bays of military aircraft. Experience has shown that an open cavity at moderately high speeds can have a profound effect on internally carried weapons, their suspension equipment, separation characteristics and the structural loads on the aircraft itself.

One of the problems associated with internal cavities is acoustic resonance. Acoustic resonance causes high pressure and high frequency fluctuating acoustic loads in and near the weapons bay. These fluctuating pressure loads are high enough to very quickly fatigue metal parts and damage sensitive electronics on "smart" weapons.

Managing the acoustic field generated by present day vertical take-off and landing (VTOL) aircraft is also of high importance. Significantly reducing the acoustic field would allow the weight of military aircraft to be reduced by eliminating the need for reinforced panels capable of withstanding the sonic fatigue caused by the acoustic environment of the impingement airflow. Significantly reducing the acoustic field would also alleviate the ground erosion caused by the lift jet system of VTOL aircraft that results in spalling of concrete, which in turn increases the risk of foreign object damage (FOD) to the engines of the aircraft. Reducing the acoustic field would also help to eliminate damage to stores caused due to internal buffeting by cavity resonance phenomena when the weapons bay doors of the aircraft are open during flight. Finally, reducing the acoustic field would significantly extend the permissible exposure time of personnel working in the vicinity of aircraft operations.

Active flow control has been touted as an attractive technique for attaining suppressed acoustic levels in military aircraft weapons bays across a wide operating envelope. Interest in active flow control methods centers around the promise of adjustable, optimal suppression for changing flight conditions. Acoustic suppression utilizing active flow control is usually achieved by seeding the unstable free shear layer traversing the bay with small amplitude disturbances (vortical, acoustic or otherwise). These "planted" disturbances grow and, in many successful cases, compete with and overwhelm the naturally occurring disturbances which would otherwise lead to potentially dangerous acoustic resonance.

Previous attempts to apply active flow control to high speed cavities in a laboratory environment have focused on perturbing the shear layer traversing the bay at frequencies near the dominant Rossiter modes. This type of forcing will be referred to as "low frequency" forcing. These low frequency (LF) active flow control attempts have met with some moderate success, but in most cases there are still, significant, energetic tones remaining after suppression which could be further reduced. Overall suppression using low frequency suppression techniques is typically on the order of about 5 dB to 10 dB in noise reduction. However, it must be kept in mind that this is the same level of performance that might be expected from a "no-moving-parts", low complexity, leading edge spoiler found on today's military strike aircraft with weapons bays.

Yet another inherent difficulty with low frequency suppression techniques is that of suppressing more than a single acoustic mode at a time. In LF flow control, a choice is often required between either accepting marginal overall suppression levels (a compromise based on suppressing one tone while augmenting others) or implementing a strategy which dedicates a separate controller to each acoustic mode to be suppressed.

It has also been known for some time that steady, energetic mass injection at the leading edge of a high speed cavity results in a dramatic reduction in acoustic resonance tone levels. This is due to the fact that the shear layer traversing across the bay (i.e., cavity) is being literally "blown off", and the impingement of the shear layer on the downstream wall of the cavity is being significantly reduced or eliminated. This type of control leads to simultaneous suppression of all resonant tones in the cavity SPL spectra, but at a rather severe cost in terms of injected mass flow rate.

In view of the foregoing, it is a principal object of the present invention to provide an active noise suppression apparatus and method for use with an aircraft for simultaneously suppressing multiple acoustic modes of the noise produced by a jet engine of the aircraft across a wide frequency spectrum.

It is still a further object of the present invention to provide an apparatus and method for actively, simultaneously suppressing multiple acoustic modes of noise generated from a jet engine in the vicinity of various cavities of an aircraft.

SUMMARY OF THE INVENTION

The above and other objects are accomplished by an apparatus and method using active flow control techniques for reducing jet engine noise across a wide frequency spectrum. In one preferred embodiment the invention comprises a series of resonance elements which are placed adjacent to one another about the periphery of an exhaust nozzle of a jet engine. Each resonance element has an inlet port and an outlet port and an interior area in communication with the inlet port and the outlet port. A pressurized air chamber supplies a pressurized airflow through the inlet of each resonance element. As the air flows through the inlet it produces a supersonic jet airflow within the resonance element. This supersonic jet airflow produces an oscillating, high frequency airflow that is dependent on the internal volume of the resonance element. This high frequency, oscillating airflow produces a high frequency, pulsed, excitation air stream through the outlet and into the interior area, or adjacent an edge, of the jet engine exhaust nozzle. The high frequency, pulsed, excitation airstream induces modifications into the shear layer of the exhaust airflow exiting from the exhaust nozzle which result in a major reduction in the noise and buffeting generated by the developing shear layer.

In one preferred embodiment air is introduced at a pressure of about 100 psi or greater into the pressurized chamber. The resonance elements are spaced apart from one another around at least a portion of the circumference of the exhaust nozzle, and preferably around the entire periphery of the exhaust nozzle. The method and apparatus of the present invention is capable of reducing noise levels of jet engines by as much as 10 dB overall sound pressure level (OASPL), and by 20 dB or more for spectral peaks associated with STVOL aircraft in a landing environment. Noise reduction benefits for commercial aircraft are also achieved with the active flow control system of the present invention.

BRIEF DESCRIPTION OF THE DRAWINGS

The various advantages of the present invention will become apparent to one skilled in the art by reading the following specification and subjoined claims and by referencing the following drawings in which:

FIG. 1 is a simplified schematic representation of one resonance element and a portion of a pressurized chamber used for inducing a high frequency, pulsed supersonic excitation airstream into the interior area of a jet engine exhaust nozzle, along with a simplified representation of the velocity profile of the pulsed, excitation airstream;

FIG. 2 is a simplified representation of a plurality of resonance elements disposed in spaced apart relation to one another about a periphery of the circumferences of a jet engine exhaust nozzle;

DETAILED DESCRIPTION OF THE PREFERRED EMBODIMENTS

Figure 3:
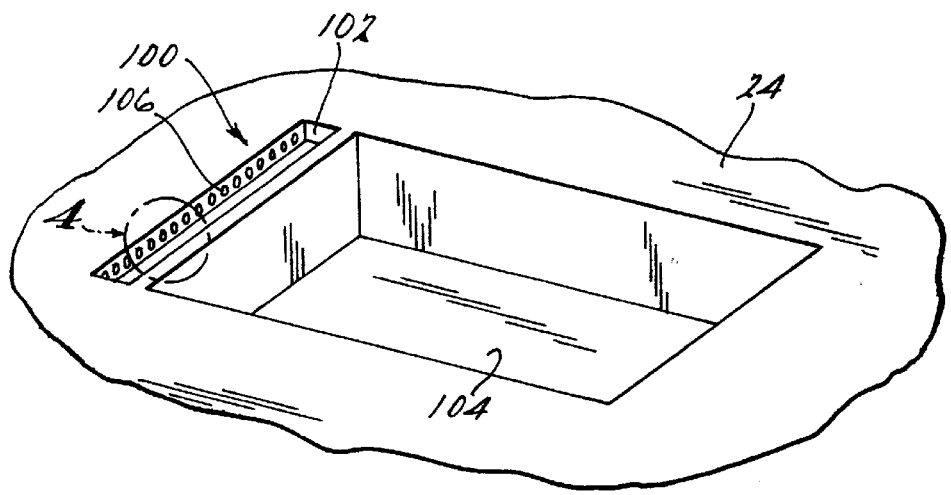
FIG. 3 is a perspective view of a weapons bay showing the active flow control apparatus disposed adjacent a leading edge of the weapons bay.

Referring to FIG. 1, there is shown an apparatus 10 for reducing jet engine noise in accordance with a preferred embodiment of the present invention. The apparatus 10 comprises a plurality of resonant cavities or chambers 12 formed by resonance elements 14. Each of the resonance elements forms a Hartmann tube resonator for providing high frequency, supersonic, excitation airstream pulses.

Each resonator element 14 includes an inlet port 16 and an outlet slot 18 both in communication with the interior area 12 of the element 14. The inlet 16 is coupled to a pressurized chamber 20 which is supplied with compressed air. Alternatively, airflow drawn into the chamber 20 while the aircraft is in flight can also be used.

The chamber 20 and resonance elements 14 are disposed on an exhaust nozzle 22 of a jet aircraft engine 24. The resonance elements 14 are disposed on the exterior wall 22a of the exhaust nozzle 22 so as to be circumferentially spaced apart around at least a major portion of the circumference of the nozzle wall 22a, and more preferably around the entire periphery of the nozzle wall 22a. The resonance elements 14 are preferably formed from a stainless steel material. The pressurized air chamber 20 may likewise be formed from stainless steel or any other suitably strong material.

The dimensions and volume of the resonance element 14 and the volume of the pressurized air chamber 20 may each vary considerably. However, in one preferred form, each resonance element 14 has a depth of between about 0.5 inch (12.7 mm) to about 1.0 inch, (25.40 mm) and a diameter between about 0.25 inch (6.35 mm) to 0.50 inch. Preferably, the depth should be twice that of the diameter.

The diameter of inlet 16 and the width of outlet 18 are also important to achieving the high frequency, pulsed, excitation airstream through the outlet 18. In one preferred form, inlet 16 comprises an opening having a convergent/divergent cross-sectional shape suitable to produce a Mach 2 jet exiting therefrom when the pressurized chamber is pressurized with a pressurized fluid (e.g., compressed air) at about 80 psi–120 psi, and more preferably about 100 psi. The operation of the inlet port 16 is enhanced by the use of a needle centerbody 16a placed at the centerline of the inlet port 16 and rigidly attached to the back of the pressurized chamber 20. Outlet slot 18 comprises a width of preferably about 0.25 inch–0.50 inch (6.35 mm–12.7 mm), and more preferably about 0.30 inch (7.62 mm).

The pressurized chamber 20 is pressurized with compressed air at a pressure of preferably about 100 psi from a compressed air source. Alternatively, a "passive" form of the invention may be employed where the pressurized air flow is provided by ambient air during flight of the aircraft. Still further, a "hybrid" form of the invention could be employed in which a combination of compressed air from a compressed air source and ambient air are used to pressurize the chamber 20.

The pressurized airflow causes a supersonic jet airstream to be generated through the inlet port 16 of each resonance element 14. This produces an oscillation whose frequency depends on the volume of the interior area 12 of each resonance element 14. The supersonic jet airstream through the inlet port 16 impinges the interior walls of the resonance element 14 thus producing a high frequency, oscillating, pulsed airstream 26 through the outlet slot 18. The frequency of oscillation of this excitation airstream 26 may vary but is preferably at least about 2500 Hz, and more preferably about 5,000 Hz. The high frequency, pulsed, excitation airstream 26 exiting through the outlet slot 18 helps to modify the shear layer produced by the engine exhaust velocity profile 26a mixing with the quiescent air outside the jet engine 24. This causes a significant reduction in the noise and buffeting generated by the developing shear layer. This noise reduction significantly helps to reduce the problems associated with noise exposure by personnel who need to work in a vicinity of the aircraft, such as individuals working on the flight deck of an aircraft carrier or individuals working at airports. The reduction in noise and buffeting also significantly reduces the risk of sonic fatigue damage to various component parts of the aircraft as well as to stores carried by the aircraft. It also serves to alleviate the ground erosion caused by the lift jet system of vertical take-off and landing (VTOL) aircraft that could otherwise result in spalling of concrete, and thus reduces the risk of possible foreign object damage to the engines of the aircraft. Finally, it increases the exposure time that personnel may spend working in the vicinity of aircraft operations.

Referring to FIG. 2, the apparatus 10, in one preferred form, is formed as a "ring" which may be disposed at the edge of the exhaust nozzle 22. The resonance elements 14 are indicated in phantom and are spaced apart around the entire periphery of the exhaust nozzle 22.

In practice the pulses generated by the multiple resonance elements 14 interact with the resonance properties of the outlet slot 18 with which they communicate. An optimal implementation will consist of an outlet slot shape which, due to its geometry, will permit operation using a minimum number of resonance elements 14, and thus a minimum mass flow rate through the compressed air inlet 16. This optimization process will reduce the drain on the resources of the aircraft employing the apparatus 10.

It is also possible to employ the energy of the stream flowing across the integration slot to energize an oscillatory motion in the output slot 18, resulting in a passive implementation of the device, requiring no compressed air for its operation. This variant is especially attractive in the case of a weapons bay cavity application.

Figure 4:
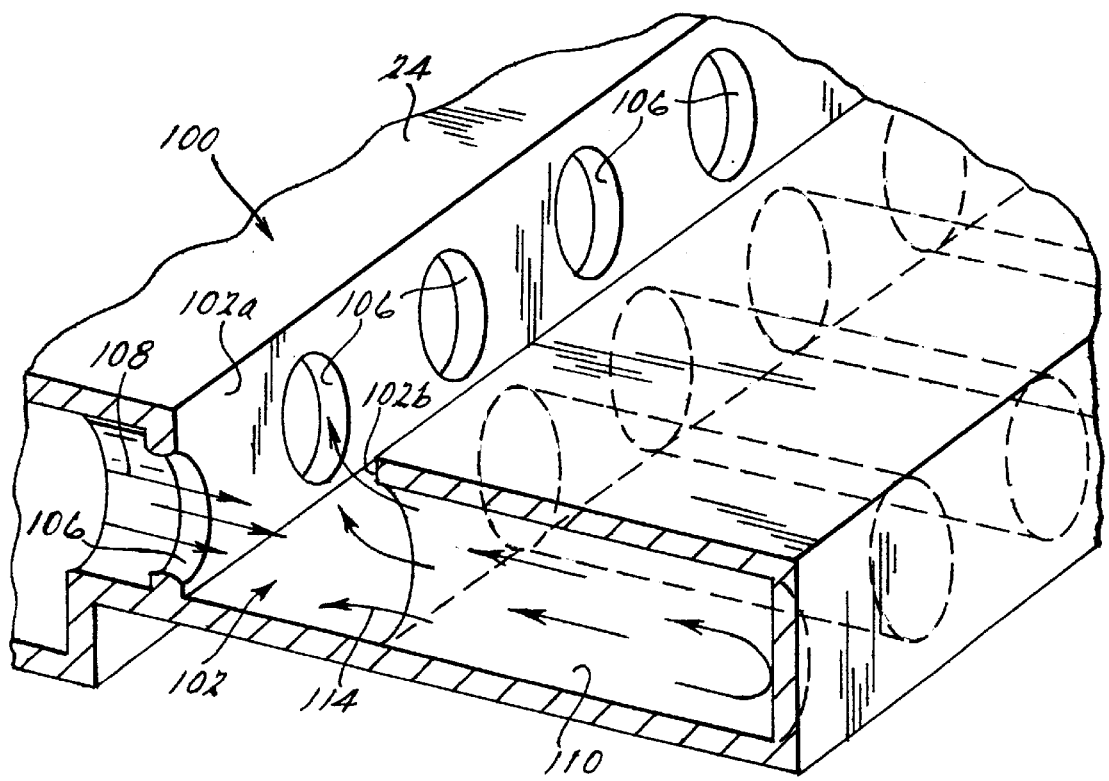
FIG. 4 is an enlarged, partial cross-sectional view of the active flow control apparatus of FIG. 3.

FIGS. 3 and 4 illustrate an active flow control apparatus 100 in accordance with an alternative preferred embodiment of the present invention. The apparatus 100 is formed with an integration slot 102 along, and parallel with, the leading edge of a cavity 104 such as a weapons bay. Referring specifically to FIG. 4, spaced apart ports 106 open on a first wall 102a of the slot 102 to supply jets of compressed air 108 across the integration slot 102 to resonant elements 110. The spacing formed by the slot 102 may vary, but in one preferred form is about 0.25 inch–0.50 inch (6.35 mm–12.7 mm), and more preferably about 0.30 inch (7.62 mm).

Each jet of compressed air 108 is directed into an aligned resonant element 110 opening onto a second wall 102b of the slot 102, which forms a spaced apart cavity from its associated port 106. The compressed airstreams 108 enter their associated resonant cavities 110 and cause high frequency, pulsed, supersonic excitation airstreams to be generated, as indicated by arrows 114. These high frequency, pulsed airstreams 114 flow into and then outwardly of the slot 102. The pulsed airstreams 114 operate to induce modifications into the developing shear layer which significantly helps to reduce the noise and buffeting caused by the developing shear layer.

Figure 5:
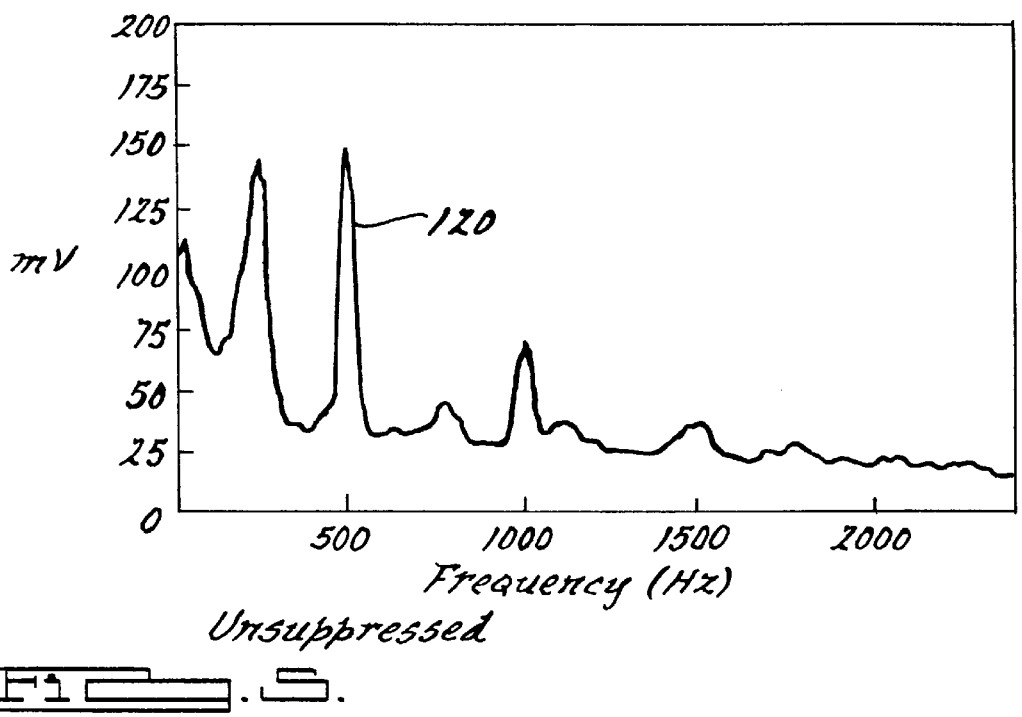
FIG. 5 is a graph illustrating an unsuppressed noise waveform measured at a cavity of an aircraft.
Figure 6:
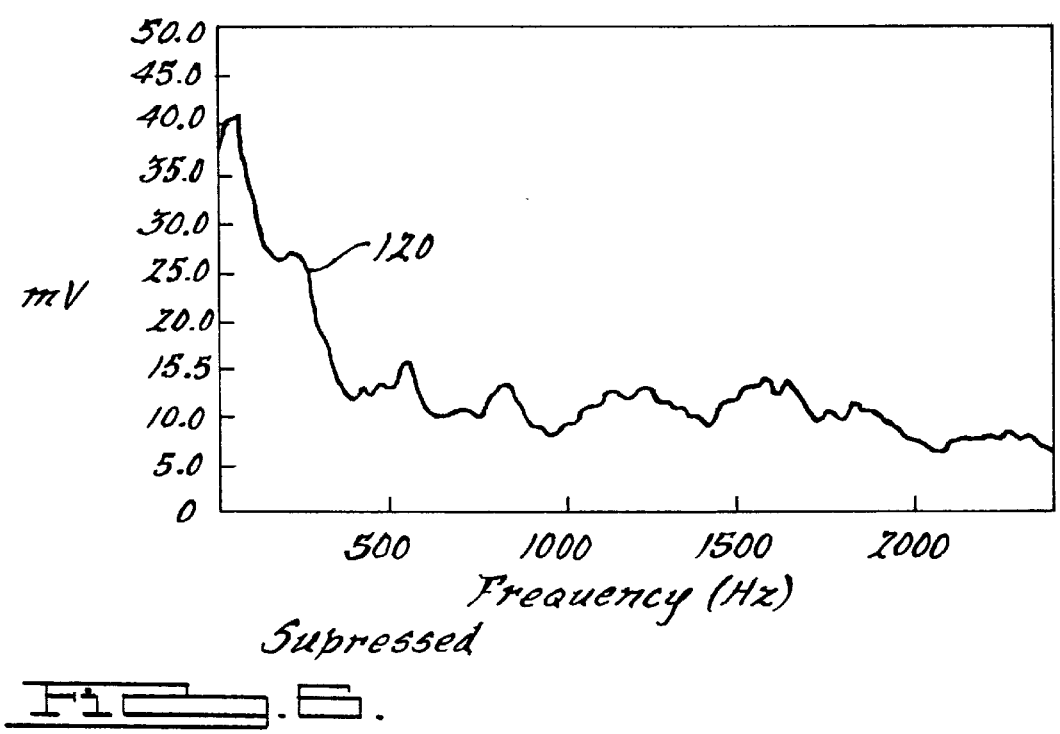
FIG. 6 shows a graph of the waveform of FIG. 5 after being suppressed in accordance with the apparatus and method of the present invention, illustrating the dramatic reduction in the acoustic level of noise adjacent the cavity area of the aircraft.

Referring briefly to FIGS. 5 and 6, the improvement in noise suppression accomplished with the present invention is illustrated. Referring specifically to FIG. 5, a waveform 120 of an unsuppressed noise signal associated with the cavity of an aircraft is illustrated. FIG. 6 illustrates the same waveform 120 after being suppressed with the apparatus 100 of the present invention.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An apparatus for reducing noise from a jet engine exhaust, comprising:
    an airflow directing system disposed adjacent a trailing edge of an exhaust nozzle of a jet engine;
    said airflow directing system forming a plurality of distinct chamber-like resonance elements disposed at least partially circumferentially about said exhaust nozzle,
    each of said resonance elements having an inlet port in communication with an interior area thereof;
    an outlet associated with each said resonance element for permitting airflow from said interior area of each of said resonant elements outwardly therefrom;
    wherein a pressurized airflow entering said inlet port of each said resonance element causes an oscillating excitation airstream to flow from said interior area of each said chamber out through said outlet and into a developing shear layer of airflow exiting from said exhaust nozzle; and
    whereby said oscillating excitation airstream induces modifications into said shear layer to thus reduce noise and buffeting generated by said shear layer.

2. The apparatus of claim 1, wherein each said chamber-like resonance element comprises a resonance tube.

3. The apparatus of claim 1, wherein said pressurized airflow comprises a compressed airflow having a pressure of about 100 pounds per square inch.

4. The apparatus of claim 1, wherein said airflow directing system comprises a pressurized chamber area in communication with said input port of said resonance element.

5. An apparatus for reducing noise from a jet engine exhaust, comprising:
    a plurality of resonant cavities formed in a first member and disposed adjacent an exhaust nozzle of said jet engine;
    a plurality of ports formed in a second member for forming supersonic jetstream airflows;
    each of said resonant cavities being aligned with an associated one of said jetstream airflows;
    wherein said jetstream airflow entering said inlet port of each said resonant cavity causes an oscillating excitation airstream to flow from said interior area of each said resonant cavity outwardly into a developing shear layer of exhaust airflow exiting from said exhaust nozzle; and
    whereby said oscillating excitation airstream has a frequency of at least about 2500 Hz and induces modifications into said developing shear layer to thus reduce noise and buffeting caused by said shear layer.

6. The apparatus of claim 5, further comprising a pressurized air chamber for supplying said inlet of each said resonant cavity with said jetstream airflow.

7. The apparatus of claim 5, wherein said resonant cavities are arranged a least partially circumferentially about said exhaust nozzle.

8. The apparatus of claim 5, further comprising a pressurized air chamber for supplying said inlet of each said resonant cavity with said jetstream airflow; and
    wherein said pressurized air chamber is pressurized to a pressure of about 100 pounds per square inch.

9. An apparatus for reducing noise from a jet engine exhaust, comprising:
    a slot formed adjacent to a leading edge of a cavity of an aircraft;
    a plurality of spaced apart input ports opening on a first wall of said slot for forming supersonic jet airstreams each being directed across said slot;

a corresponding plurality of resonant cavities formed so as to each open onto a second wall of said slot, and each said resonant cavity being aligned with an associated one of said airstreams to receive its associated said airstream, wherein each said airstream causes a high frequency, pulsed excitation airstream to be generated outwardly from its associated said resonant cavity into and then outwardly of said slot; and whereby said high frequency, pulsed, excitation airstreams operate to modify a shear layer of airflow at said leading edge of said cavity to thereby reduce noise and buffeting at said leading edge of said cavity.

10. The apparatus of claim 9, wherein a compressed airflow of at least about 100 pounds per square inch is used to form said jet airstreams.

11. The apparatus of claim 9, wherein said excitation airstream comprises a pulsed, supersonic jet airstream having a frequency of at least about 2500 Hz.

12. The apparatus of claim 9, wherein said excitation airstream comprises a pulsed, supersonic airstream having a frequency of about between about 2500 Hz–5000 Hz.

13. A method for reducing noise and buffeting from an exhaust airflow exiting from an exhaust nozzle of a jet engine, said method comprising the steps of:

generating a plurality of supersonic, oscillating airflows having a frequency of at least about 2500 Hz at spaced apart locations about a periphery of said exhaust nozzle; and causing said supersonic, oscillating airflows to be injected into an exhaust airflow exiting from said exhaust nozzle to thereby modify a developing shear layer of said exhaust airflow to cause a reduction in noise and buffeting associated with said shear layer.

14. A method for reducing noise and buffeting from a developing shear layer near a cavity of an aircraft during flight of the aircraft, said method comprising the steps of:

forming a slot in a panel of said aircraft adjacent to a leading edge of said cavity;

forming a plurality of spaced apart ports in a first wall of said slot for directing a plurality of supersonic jets of airflow into said slot;

forming a plurality of spaced apart resonant cavities in a second wall of said slot, each of said resonant cavities being in alignment with a respective one of said ports for receiving said supersonic jets of airflow; and whereby said resonant cavities receive said jets of airflow and cause high frequency, pulsed, excitation airstreams to be generated which are directed into and outwardly of said slot, said airstreams operating to modify said developing shear layer to reduce noise and buffeting at said cavity.

15. The method of claim 14, wherein said high frequency, pulsed, excitation airstreams each have a frequency of at least about 2500 Hz.

* * * * *

UNITED STATES PATENT AND TRADEMARK OFFICE
CERTIFICATE OF CORRECTION

PATENT NO.    : 6,375,118 B1
DATED         : April 23, 2002
INVENTOR(S)   : Valdis Kibens and Ganesh Raman It is certified that error appears in the above-identified patent and that said Letters Patent is hereby corrected as shown below:

<u>Column 1,</u>
Line 4, after the title, add the following paragraph:

-- GOVERNMENT RIGHTS
This invention was made with government support provided by the USAF under the terms of No. F33615-96-D-3011. The government has certain rights in the invention. --

Signed and Sealed this

Fourth Day of February, 2003

JAMES E. ROGAN
*Director of the United States Patent and Trademark Office*